United States Patent [19]

Kazami et al.

[11] Patent Number: 4,637,702

[45] Date of Patent: Jan. 20, 1987

[54] SAFETY APPARATUS FOR FEEDING A FILM OF A CAMERA

[75] Inventors: Kazuyuki Kazami, Tokyo; Hiroshi Wakabayashi, Yokohama, both of Japan

[73] Assignee: Nippon Kogaku K. K., Tokyo, Japan

[21] Appl. No.: 784,460

[22] Filed: Oct. 4, 1985

[30] Foreign Application Priority Data

Oct. 11, 1984 [JP] Japan ................................ 59-213128

[51] Int. Cl.⁴ ............................................... G03B 1/12
[52] U.S. Cl. ............................................... 354/173.11
[58] Field of Search ........................... 354/173.1, 173.11

[56] References Cited

U.S. PATENT DOCUMENTS 4,021,826  5/1977  Iwata et al. .................... 354/173.11
4,367,026  1/1983  Terada et al. .................. 354/173.11
4,457,605  7/1984  Yamamoto et al. ............. 354/173.11

Primary Examiner—Michael L. Gellner
Attorney, Agent, or Firm—Shapiro and Shapiro

[57] ABSTRACT

A camera is constituted in such a manner that the opening and closing states of the shutter are detected in response to various operations which are performed before the operation for feeding a film is started and when it is detected that the shutter is open in the case where it should be closed, the subsequent film feeding operation is inhibited.

With the structure, the film feeding operation is not performed with the shutter opened.

3 Claims, 6 Drawing Figures

_4,637,702_

SAFETY APPARATUS FOR FEEDING A FILM OF A CAMERA

BACKGROUND OF THE INVENTION

1. Field of the Invention

The present invention relates to a camera in which opening and closure of a shutter are controlled by an electrical signal and, more particularly, to a camera in which feeding of a film is driven by an electric motor.

2. Description of the Prior Art

In cameras using a roll film, there are generally three kinds of cases for feeding the film installed in the camera. The first case relates to winding-up in which the film is fed on a one-frame unit basis each time the photographing operation is executed. The second case relates to rewinding in which the film is fed into a cartridge or magazine after completion of exposure. The third case relates to initial winding in which when the film is installed into a camera, the reader portion of the film is fed and the unexposed frames are continuously wound up without photographing so as to face the photographing opening. There has been well-known the camera in which those film feeding operations, namely, the winding-up, rewinding and initial winding operations are respectively added to the operation sequence of the camera and are automatically controlled. In such a well-known camera, the winding-up is performed in response to generation of an exposure completion signal representing that the period of time required until the shutter is completely closed from the timing of generation of a closing start signal of the shutter has elapsed; the rewinding is carried out in response to a film end signal which is generated after completion of exposure of all frames of the film or to the manual setting operation for rewinding; and the initial winding is executed in response to the closure of the back cover of the camera which is performed after installing an unused film or to the depression of the release button which is performed after the back cover was closed.

In such a kind of cameras, there can occur accidents such that the shutter is not closed in spite of the fact that the shutter closing start signal has been generated and the shutter is opened in spite of the fact that no shutter opening start signal has been generated.

In the case where such accidents have occurred, if the winding-up or rewinding is started in accordance with the foregoing operations, the film after completion of the photographing will be again exposed and ruined. On one hand, if initial winding is started, the first frame will have been unnecessarily exposed. If the user continues the photographing operation in this state without being aware of those accidents, all of the frames photographed after the accident will have become spoilt.

SUMMARY OF THE INVENTION

It is an object of the present invention to provide a camera in which the film feeding operation is not performed with the shutter opened.

Another object of the invention is to obtain a safety apparatus of a camera for preventing occurrence of such an accident.

A camera according to the present invention is constituted in such a manner that the opening and closing states of the shutter are detected in response to various operations which are performed before the operation for feeding a film is started and when it is detected that the shutter is open in the case where it should be closed, the subsequent film feeding operation is inhibited.

DESCRIPTION OF THE PREFERRED EMBODIMENT

A schematic arrangement of an embodiment will now be described with reference to the accompanying drawings.

Figure 1:
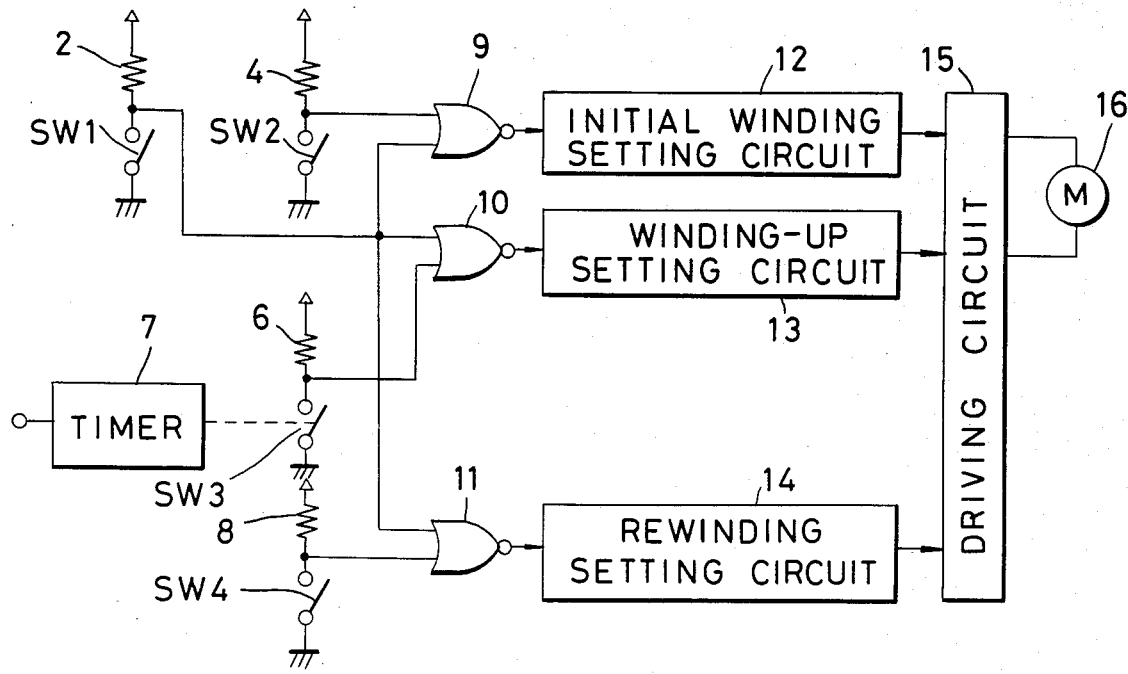
FIG. 1 is a circuit block diagram showing an embodiment of the present invention.

In FIG. 1, a shutter switch SW1 monitors the opening and closing states of a shutter and is turned on or off. In this embodiment, the switch SW1 is turned on when the shutter is actually closed and it is turned off when the shutter is actually open. The shutter switch SW1 is connected to a power source voltage through a resistor 2, so that an output at an L level is generated at a node with the resistor 2 in the switch-on condition in which the shutter is closed, and an output at a H level is generated in the switch-off condition in which the shutter is open.

Figure 2:
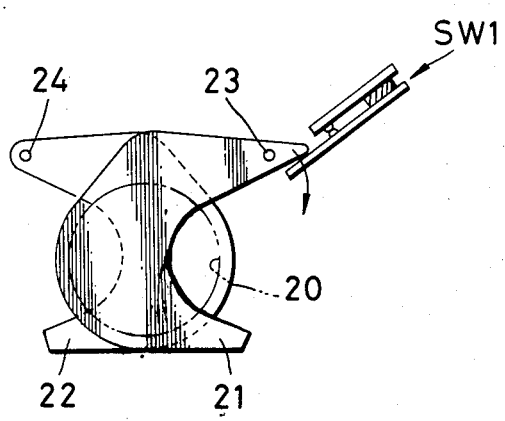
FIG. 2 is a plan view showing a shutter switch.

The shutter switch SW1 can be constituted as shown in FIG. 2. A pair of sector blades 21 and 22 for closing the exposing aperture 20 are rotated around axes 23 and 24 by way of a well-known blade driving mechanism (not shown), respectively. The blade 21 rotates clockwise and opens the aperture 20 and opens the switch SW1 at one end. After an expiration of a predetermined period of time, the blade 21 is returned to the position shown and closes the switch SW1.

A switch SW2 for starting the initial winding operation is connected to the power source voltage through a resistor 4 and an output at an L level is generated at a node with the resistor 4 when this switch is turned on. The switch SW2 is turned on in response to the closing of the back cover of the camera which is performed after an unused film has been installed into the camera or to the depression of the release button which is carried out after the back cover has been closed.

As for a practical constitution of the switch SW2, the switch shown in the U.S. Pat. No. 4,342,509 or the like can be used; therefore, it is not shown in this specification.

A switch SW3 for starting the winding-up operation is connected to the power source voltage through a resistor 6 and an output at an L level is generated at a node with the resistor 6 when this switch is turned on. The switch SW3 is turned on in response to an output of a timer 7. The timer 7 starts timing from the time point when a closing start signal of the shutter is generated after a predetermined quantity of exposure has been obtained and generates the output after an elapse of period of time required for the shutter to be completely closed.

A switch SW4 for starting the rewinding operation is connected to the power source voltage through a resistor 8 and an output at an L level is generated at a node with the resistor 8 when this switch is turned on. The switch SW4 is turned on in response to generation of a film end signal which is generated when it is detected that after completion of winding-up of all frames of the film, the frame of the film cannot be further pulled out from the film cartridge or to manual setting of rewinding by way of an R button.

A NOR gate 9 has two inputs respectively connected to the shutter switch SW1 and switch SW2 and is in the permissible state when an output at an L level is derived due to turn-on of the shutter switch SW1 after the shutter has been closed. The switch SW2 is OFF as shown in the diagram in this permissible state, so that the NOR gate 9 generates the L-level output. When the switch SW2 is closed, the NOR gate 9 generates an H-level output and sets the initial winding operation. On one hand, when the shutter is opened, the switch SW1 is turned on, so that the H-level output is generated and the NOR gate 9 is set into the inhibiting state. Thus, the output of the NOR gate 9 is held at an L level and the initial winding operation is inhibited irrespective of the turn-on and turn-off of the switch SW2.

A NOR gate 10 has two inputs respectively connected to the output of the shutter switch SW1 and to the switch SW3. Similarly to the case of the NOR gate 9, the L-level signal is generated when the switch SW1 is turned on after the shutter has been closed and the NOR gate 10 is set into the permissible state. When the switch SW3 is OFF, the output of the NOR gate 10 is at an L level. When the switch SW3 is closed, the NOR gate 10 generates an H-level output and sets the winding-up operation. On the other hand, when the shutter is opened and the shutter switch SW1 is opened, the H-level output is generated. In this state, the output of the NOR gate 10 is fixed to an L level irrespective of the turn-on and turn-off of the switch SW3, thereby inhibiting the rewinding operation.

A NOR gate 11 has two inputs respectively connected to the output of the shutter switch SW1 and to the switch SW4. Similarly to the case of the NOR gate 9, an L-level output is generated when the shutter is closed and the shutter switch SW1 is turned on, so that the NOR gate 11 is set into the permissible state. When the switch SW4 is OFF, the L-level output is generated from the NOR gate 11. When the switch SW4 is closed, the H-level output is generated from the NOR gate 11 and the rewinding operation is performed. On the other hand, the H-level output is generated when the shutter is opened and the shutter switch SW1 is opened. In this state, the output of the NOR gate 11 is fixed to an L level and the rewinding operation is inhibited irrespective of the turn-on and turn-off of the switch SW4.

An initial winding setting circuit 12 sets the initial winding operation by the H-level output from the NOR gate 9 and performs the initial winding of an unused film just installed due to driving of a motor 16 by way of a driving circuit 15.

Figure 3:
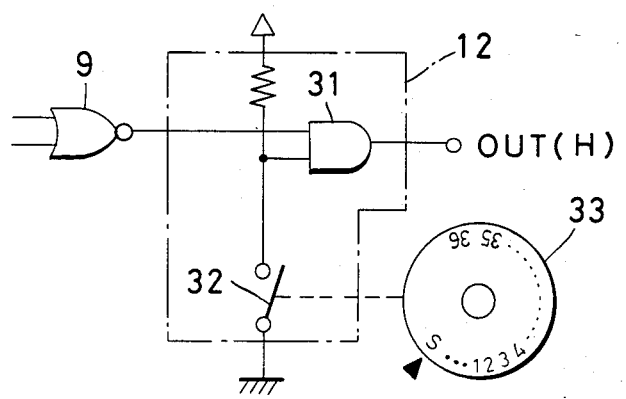
FIG. 3 is a diagram showing an initial winding setting circuit.

As shown in FIG. 3, the initial winding setting circuit 12 has an AND gate 31 and a switch 32. The switch 32 is interlocked with a film counter 33 of a camera and is OFF during the initial winding of the film. The switch 32 is turned on when the counter 33 designates "1" indicative of exposure of the first frame of the film. The AND gate 31 generates an H-level signal when the output of the NOR gate 9 is at an H level and the switch 32 is OFF.

A winding-up setting circuit 13 outputs a signal for setting the winding-up operation to the driving circuit 15 in response to the H-level output from the NOR gate 10. The driving circuit 15 then drives the motor 16 to feed one frame of the film.

Figure 4:
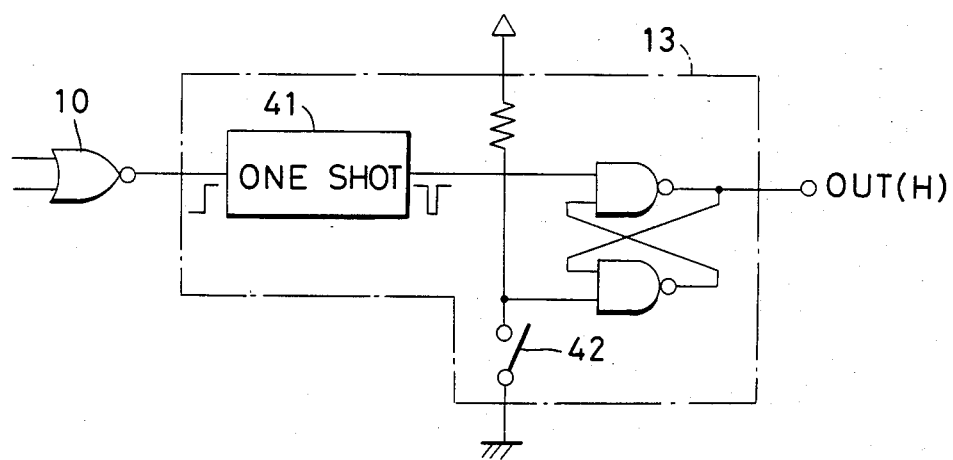
FIG. 4 is a diagram showing a winding-up setting circuit.

As shown in FIG. 4, the winding-up setting circuit 13 has a one-shot multivibrator 41, an RS flip-flop and a switch 42 which is turned on each time one frame of the film is wound up. When the output of the NOR gate 10 becomes an H level after the shutter has been completely closed, the multivibrator 41 generates a pulse at an L level in response to the leading edge of the H-level output of the NOR gate 10. The RS flip-flop latches this L-level pulse and generates an H-level output.

After completion of winding-up of one frame of the film, the switch 42 is turned on, so that the RS flip-flop releases the latching in response to the signal generated from the switch 42 at this time. Thus, the output of the circuit 13 becomes an L level.

Figure 5:
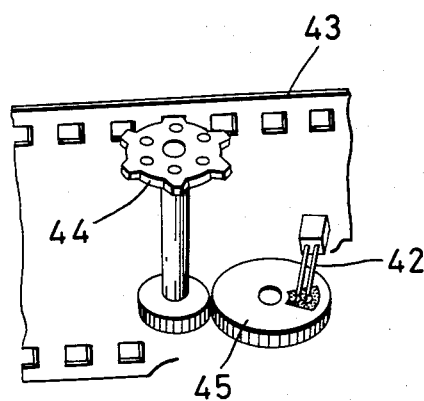
FIG. 5 is a perspective view showing a switch for detecting winding-up of one frame of a film.

As shown in FIG. 5, the switch 42 is closed for every rotation of a gear 45 driven in association with a free sprocket 44 adapted to be come into engagement with perforation of a film 43. One rotation of the gear 45 corresponds to the length of one frame of the film.

A rewinding setting circuit 14 outputs a signal for setting the rewinding operation to the driving circuit 15 in response to the H-level output from the NOR gate 11. The driving circuit 15 rewinds the film by reversely driving the motor 16.

Figure 6:
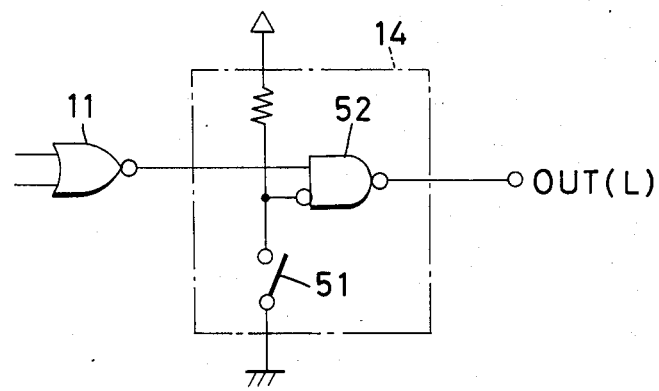
FIG. 6 is a diagram showing a rewinding setting circuit.

The rewinding setting circuit 14 is constituted as shown in FIG. 6. When the output of the NOR gate 11 is at an H level, an NAND gate 52 generates an L-level output while a switch 51 is closed. As the switch 51, the switch as shown in, for example, the U.S. Pat. No. 4,379,629 may be used. The switch 51 is opened by detecting that the reader portion of the film was removed from the spool after the film had been rewound.

The driving circuit 15 is constituted so as to forwardly rotate the motor 16 in response to the H-level output from the circuit 12 or 13 and reversely rotate the motor 16 in response to the L-level output from the circuit 14. For the forward rotation of the motor 16, the motor 16 is interlocked with the sprocket and the film winding spool through a well-known mechanism. For the reverse rotation, the motor 16 is interlocked with the rewinding axis adapted to be coupled to the spool in the film cartridge.

In addition to the initial winding, winding-up and rewinding functions of the film due to driving of the motor as mentioned above, the shutter release operation is carried out in the following manner. Namely, current supply to an electromagnetic solenoid is controlled and the shutter is opened and closed in response to the shutter opening start signal which is generated on the basis of the operation of the shutter release button (not shown) and to the closing start signal which is generated from an exposure control circuit.

The operation of the embodiment will then be explained.

When an unused film is installed into a camera and the back cover is closed or the release button is pressed, the switch SW2 is turned on, so that the L-level signal is transmitted to one input terminal of the NOR gate 9.

In the case where the shutter is in the normal state, i.e., when it is closed, the shutter switch SW1 is ON, so that the L-level signal is sent to the other input terminal of the NOR gate 9. Thus, the level of the output of the NOR gate 9 is inverted to an H level. In response to this H level signal, the initial winding setting circuit 12 transmits a set output to the driving circuit 15 and forwardly rotates the motor 16, thereby winding up the film until the first frame of the film faces the photographing opening.

When the shutter is in the abnormal state, i.e., when it is open, the shutter switch SW1 is OFF, so that the other input terminal of the NOR gate 9 is maintained at an H level. Since the output of the NOR gate 9 is held at an L level, the circuit 12 does not operate and the driving circuit 15 does not rotate the motor 16 as well.

When the release button is pressed for photographing after completion of the initial winding, the photo measuring and distance measuring operations are started. After completion of these operations, the shutter opening start signal is generated and the shutter is opened. When a predetermined exposure amount is obtained, the shutter closing start signal is generated. After an expiration of the period of time required to completely close the shutter from this time point of generation of the shutter closing start signal, the switch SW3 is turned on and the L-level signal is sent to one input terminal of the NOR gate 10.

In the case where the shutter is in the normal state, i.e., when it is closed, the shutter switch SW1 is ON, so that the L-level signal is sent to the other input terminal of the NOR gate 10. Therefore, the level of the output of the NOR gate 10 is inverted to an H level. In response to this H-level signal, the winding-up setting circuit 13 transmits a set output to the driving circuit 15 and forwardly rotates the motor 16 by one frame, thereby feeding the film which has already been photographed and allowing the unexposed film to face the photographing opening.

When the shutter is in the abnormal state, namely, when it is open, the shutter switch SW1 is OFF, so that the other input terminal of the NOR gate 10 is at an H level. Thus, the output of the NOR gate 10 is held at an L level and the circuit 13 does not operate and the driving circuit 15 does not rotate the motor 16 as well.

When the film end signal is generated after all frames of the film have been completely photographed, or when the rewinding operation is manually set, the switch SW4 is turned on. The L-level signal is sent to one input terminal of the NOR gate 11.

In this case, when the shutter is in the normal state, namely, when it is closed, the shutter switch SW1 is ON, so that the L-level signal is sent to the other input terminal of the NOR gate 11. Thus, the level of the output of the NOR gate 11 is inverted to an H level. In response to this H-level signal, the rewinding setting circuit 14 transmits a set output to the driving circuit 15 and continuously reversely rotates the motor 16, thereby rewinding the photographed film into the cartridge.

When the shutter is in the abnormal state, i.e., when it is open, the shutter switch SW1 is OFF, so that the other input terminal of the NOR gate 11 is held to an H level. Therefore, the output of the gate 11 is maintained at an L level and the circuit 14 does not operate and the driving circuit 15 does not rotate the motor 16 as well.

What we claim is:

1. A camera comprising:
   shutter means which has a blade member and starts displacement of said blade member for opening an exposing aperture in response to a first electric signal and starts displacement of said blade member for closing said exposing aperture in response to a second electric signal;
   film feeding means having an electric motor and means for driving said electric motor for feeding a film installed into said camera, said feeding of the film including initial winding for allowing the first frame of said film to face said aperture, winding-up for allowing the subsequent frame to face said aperture forevery exposure, and rewinding of the exposed film;
   monitor means for monitoring the displacement of said blade member and generating a detection output when said aperture is open; and
   means for inhibiting the initial winding, winding-up and rewinding of said film feeding means in response to the detection output of said monitor means.

2. A camera according to claim 1, wherein said monitor means includes switch means which responds to the displacement of said blade member.

3. A camera according to claim 1, wherein said film feeding means includes circuit means for controlling current supply to said electric motor and signal generating means for generating first, second and third signals for respectively starting said initial winding, winding-up and rewinding to said circuit means,
   and said inhibiting means includes gate means which is provided between said signal generating means and said circuit means and is gated off in response to said detection output.

* * * * *